March 26, 1929. P. S. LEGGE 1,706,406
SAWING MACHINE
Filed Feb. 15, 1927 6 Sheets-Sheet 1

Inventor:
Peter S. Legge
by Emery Booth Janney & Varney
Attys

March 26, 1929. P. S. LEGGE 1,706,406
SAWING MACHINE
Filed Feb. 15, 1927 6 Sheets-Sheet 2
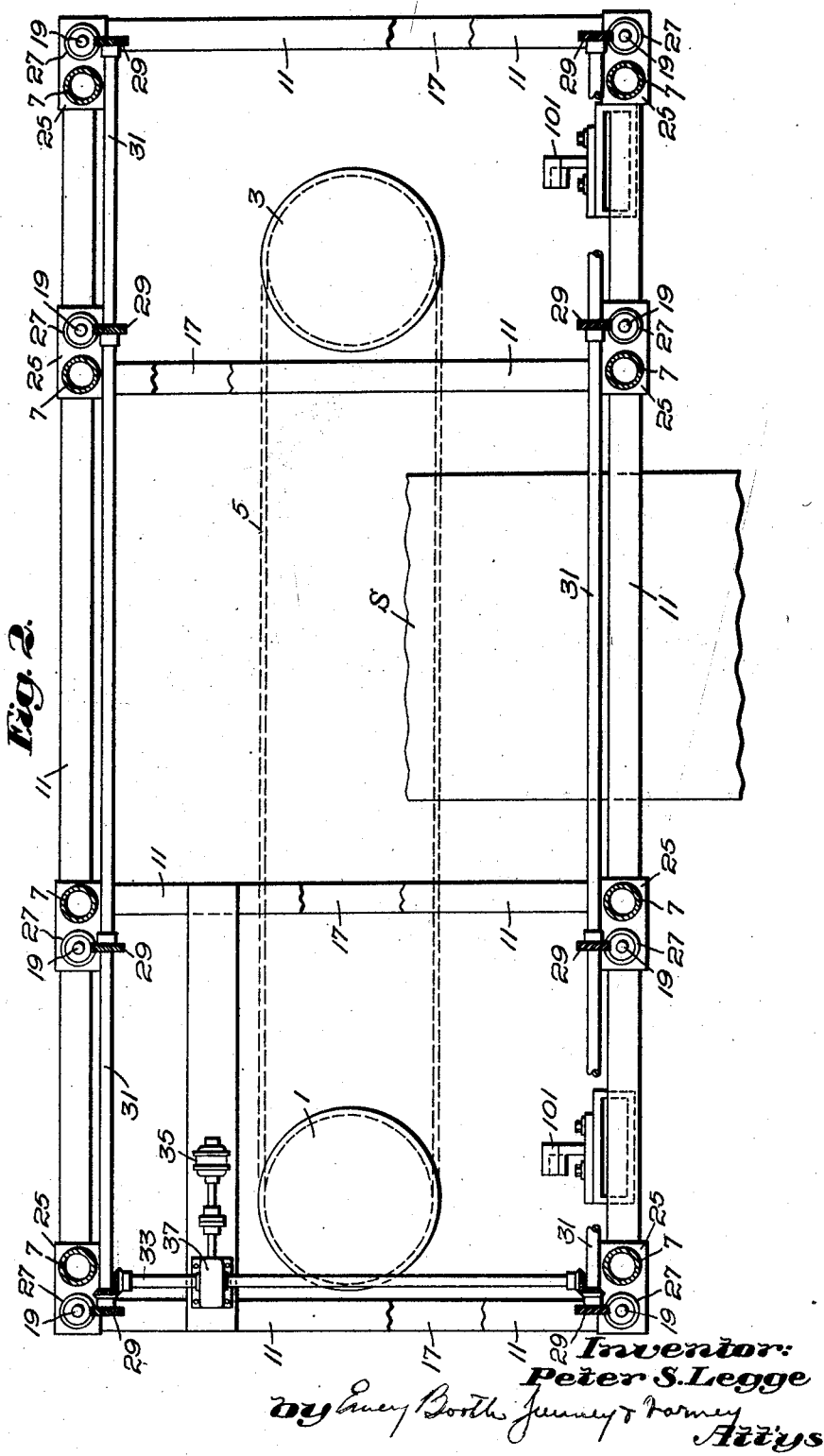

March 26, 1929.　　P. S. LEGGE　　1,706,406
SAWING MACHINE
Filed Feb. 15, 1927　　6 Sheets-Sheet 3
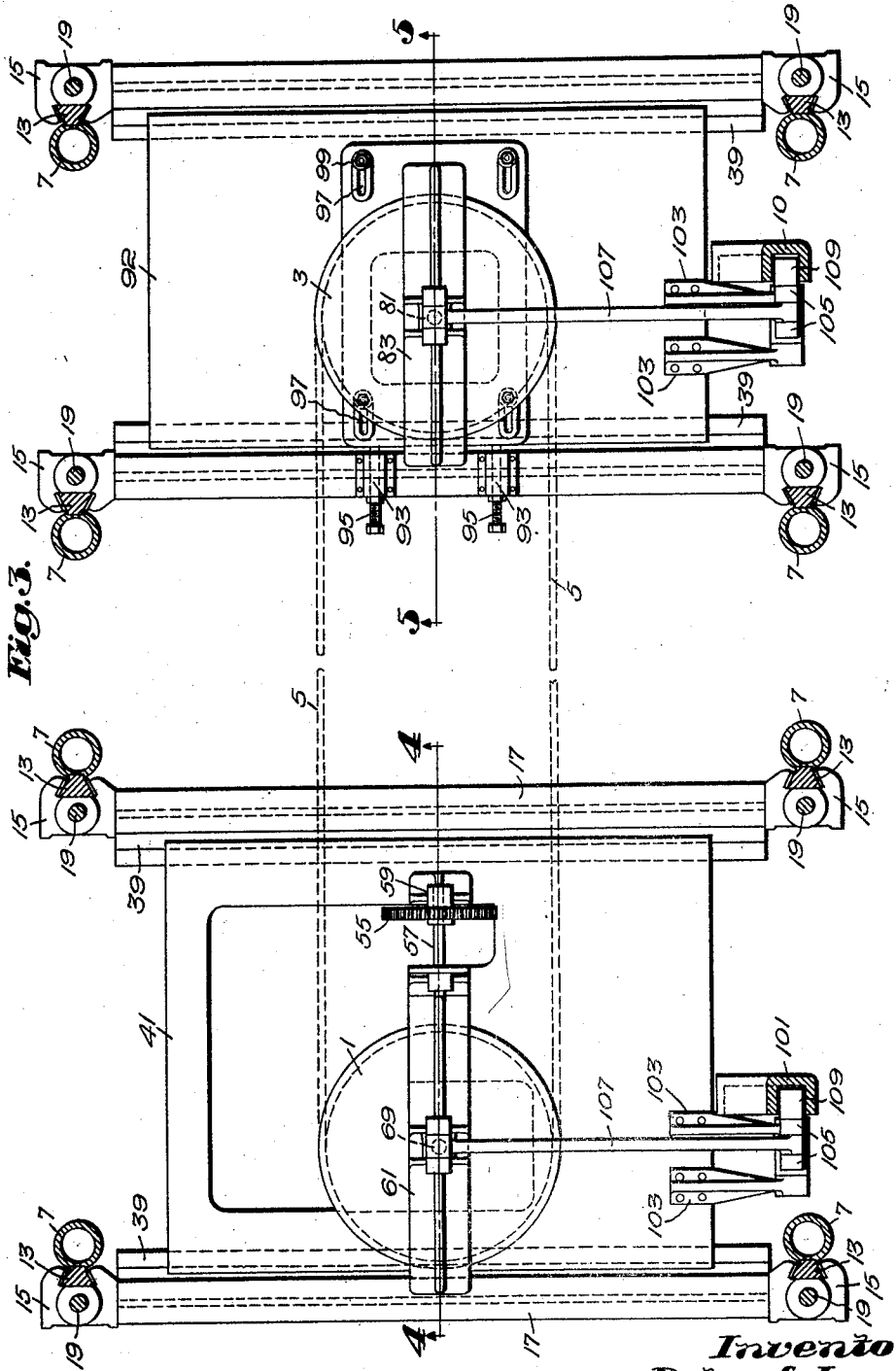

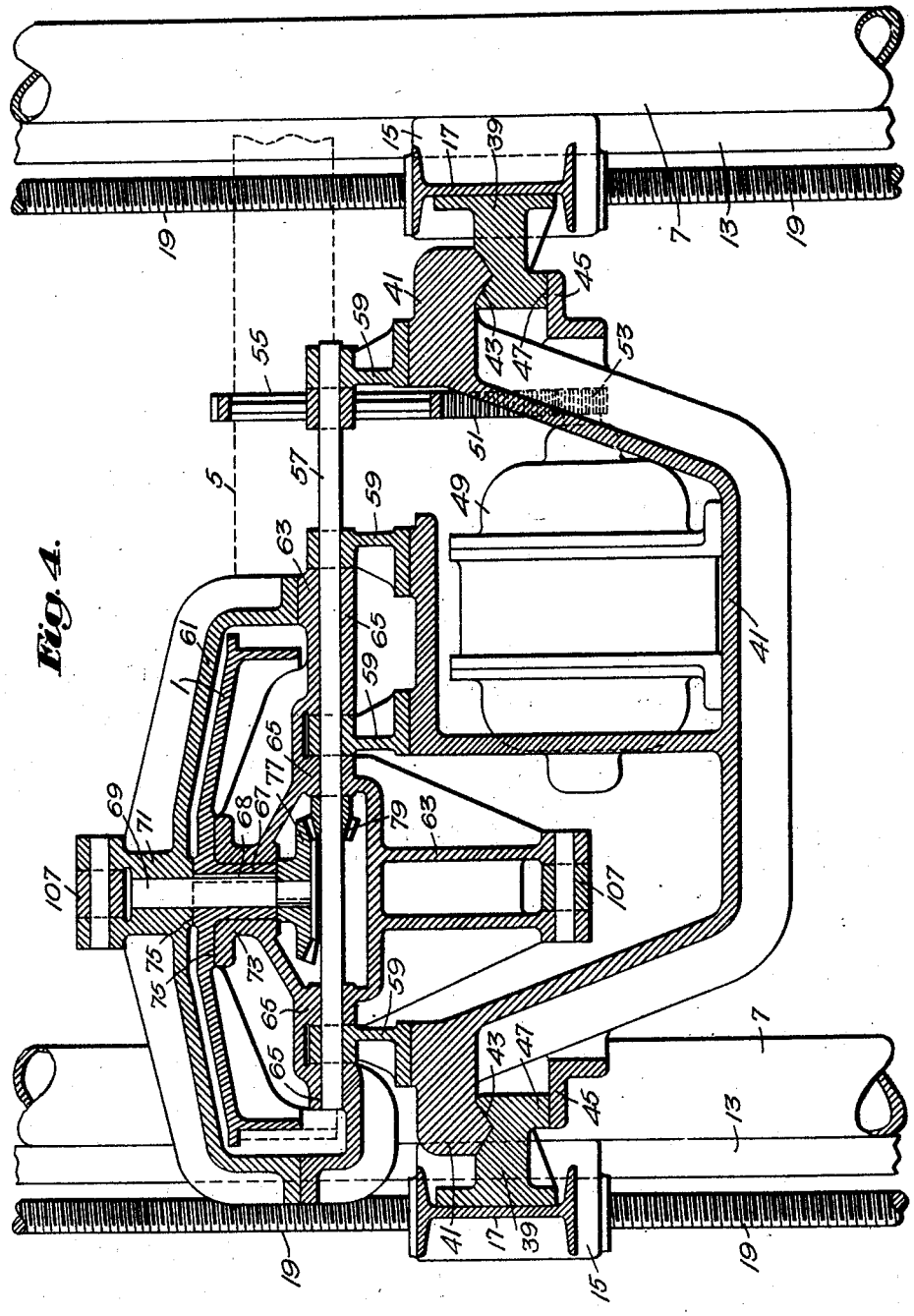

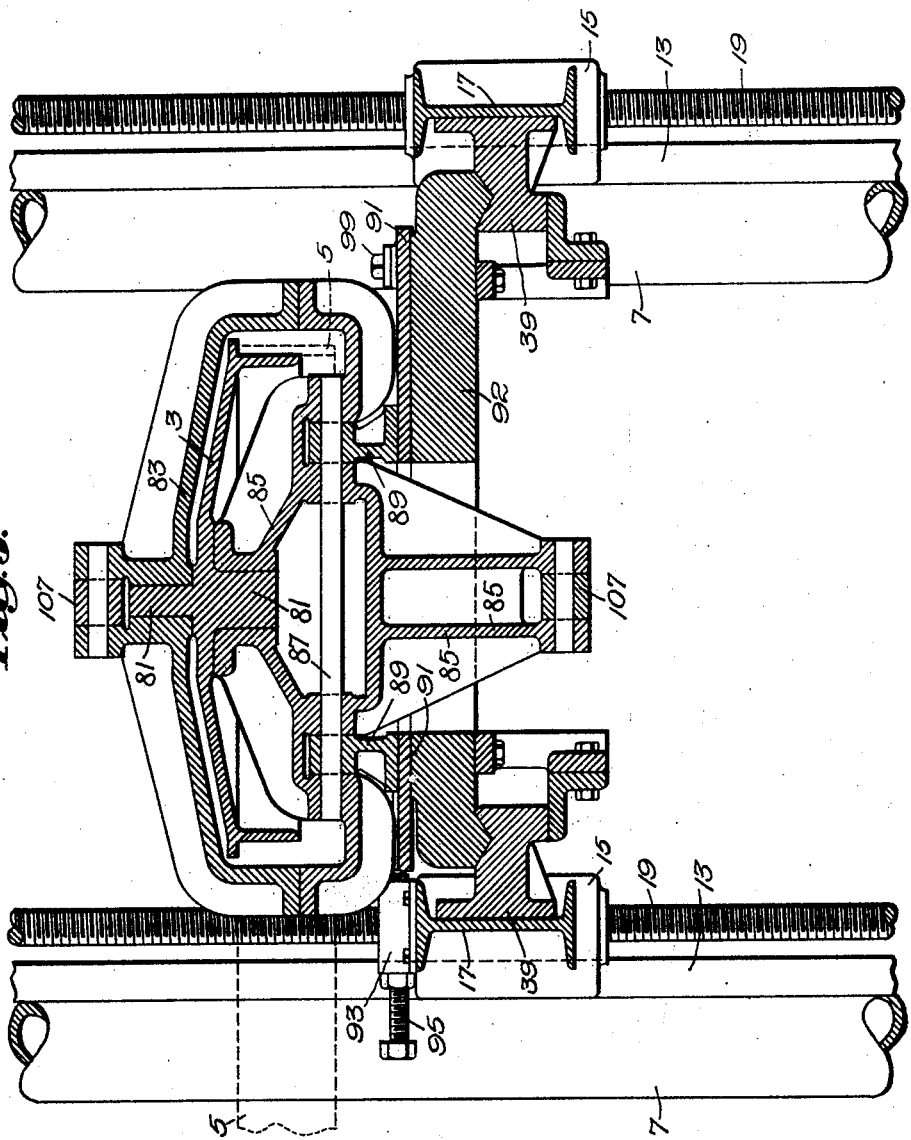

March 26, 1929.  P. S. LEGGE  1,706,406
SAWING MACHINE
Filed Feb. 15, 1927   6 Sheets-Sheet 6
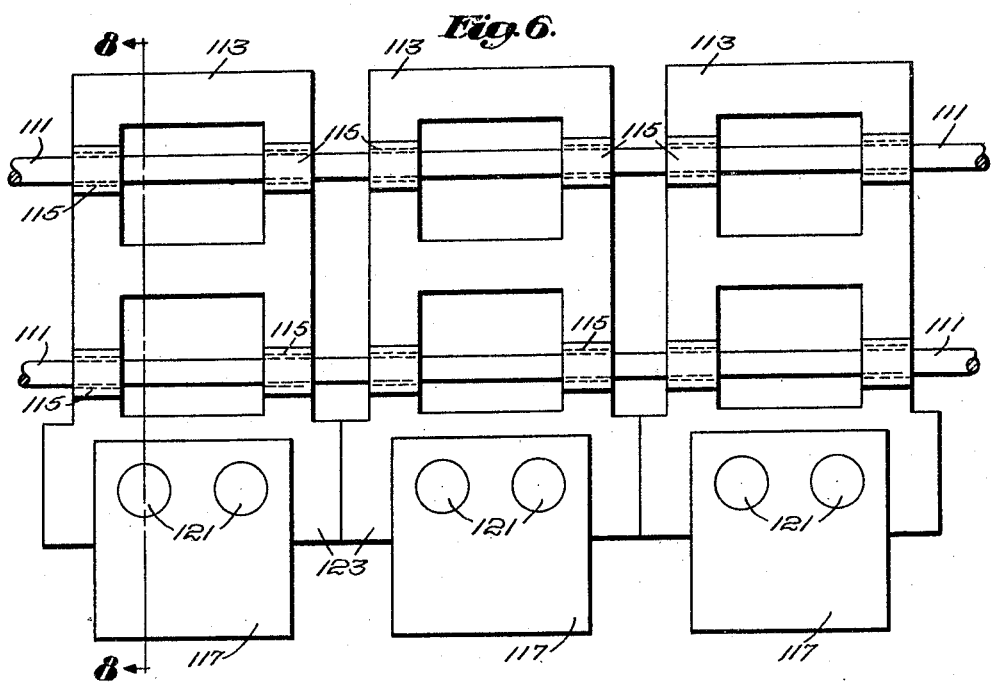
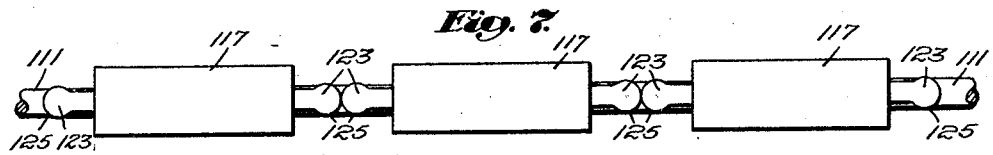
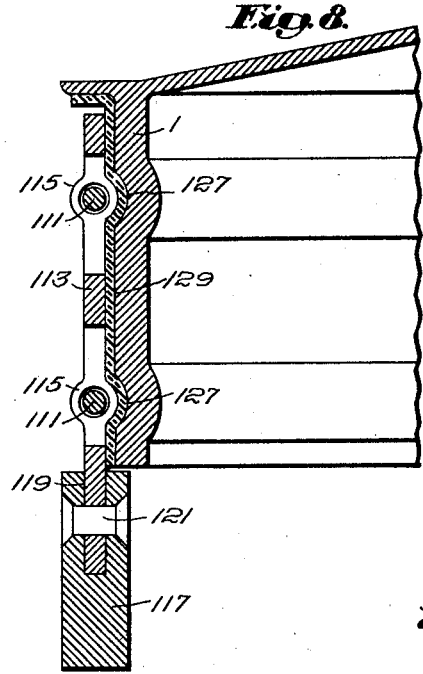
Inventor:
Peter S. Legge
by Emery Booth Janney & Varney
Attys Patented Mar. 26, 1929.

1,706,406

UNITED STATES PATENT OFFICE.

PETER S. LEGGE, OF SOMERVILLE, MASSACHUSETTS.

SAWING MACHINE.

Application filed February 15, 1927. Serial No. 168,458.

My invention relates to sawing machinery, and particularly but not exclusively to sawing machines for stone.

The invention will be best understood from the following description when read in the light of the accompanying drawings illustrating a specific embodiment of the invention, while the scope of the invention will be more particularly pointed out in the appended claims.

In the drawings:—

Fig. 1 shows an end elevation of a machine constructed according to the invention;

Figs. 2 and 3 respectively are sections on the lines 2—2 and 3—3 of Fig. 1, with parts omitted;

Figs. 4 and 5 respectively are sections on the lines 4—4 and 5—5 of Fig. 3;

Fig. 6 shows in elevation a section of the length of a saw constructed according to the invention;

Fig. 7 is a bottom view of the saw constructed according to Fig. 6; and

Fig. 8 is a section through the rim of a saw guiding or driving pulley with the saw passing over it and corresponds to a section on the line 8—8 of Fig. 6.

Figure 1:
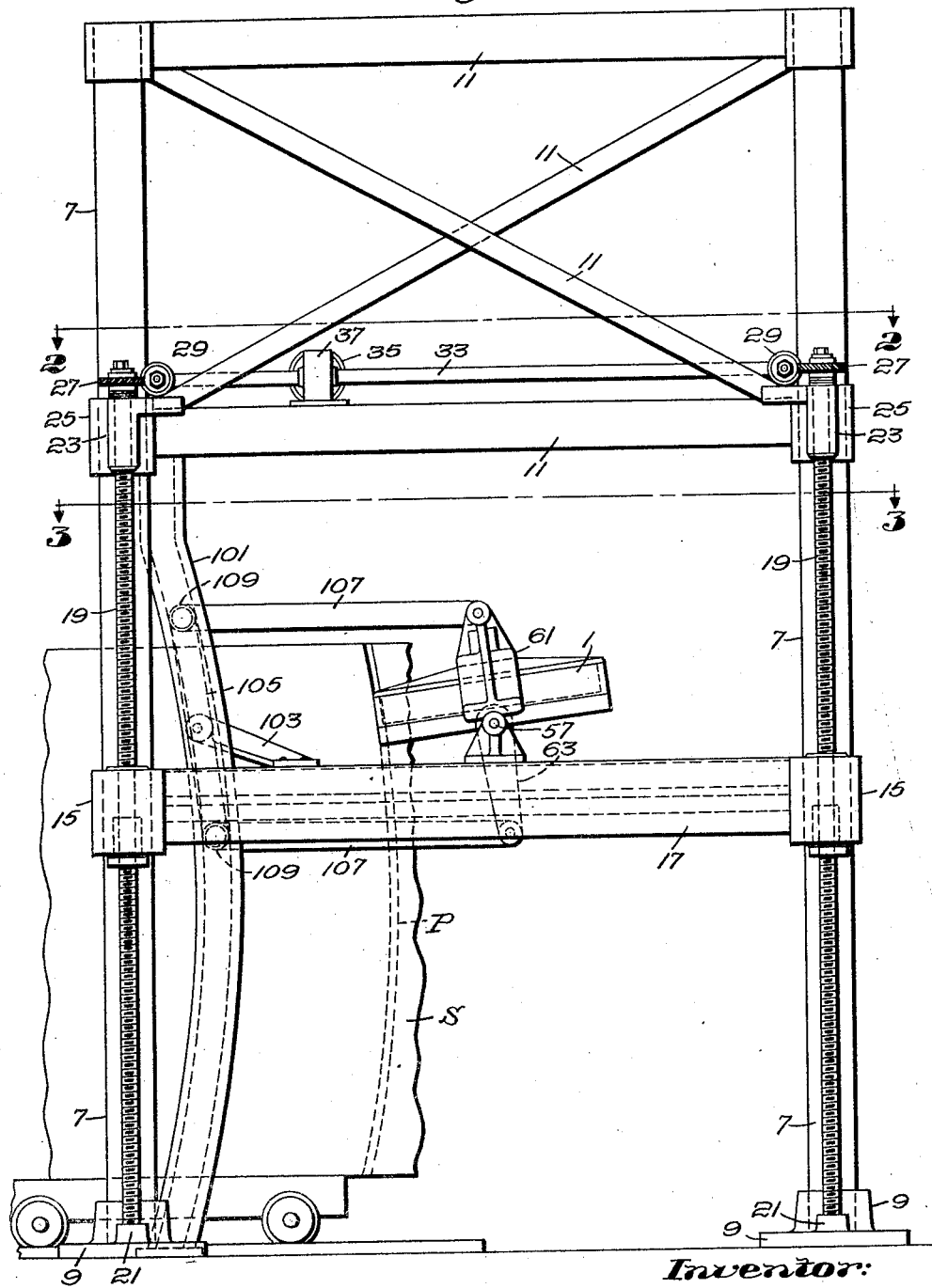

In the present embodiment of the invention the saw is a band-saw, that is to say one which is in the form of an endless belt, chain, cable, wire, or the like guided over pulleys. In the drawings I have exemplified this construction by a pair of pulleys 1 and 3 about which passes such a saw 5 for operating upon the stone S, the saw in Figs. 1 to 5 being indicated diagrammatically, while in Figs. 6, 7 and 8 is illustrated a specific example of one form of saw adapted for use on the machine when used for cutting granite. It will be understood however that the invention is not limited to use of saws having cutting portions which are moved in a continuous direction nor to saws which are endless.

Herein I have shown the pulleys as supported on a frame-work which comprises the eight vertical columns 7 which, as shown by Fig. 1, at their lower ends are secured to flange members 9 resting upon the foundation for the machine and at their upper ends are braced by structural steel trusses comprising the members 11. Between the truss work and the foundation the columns 7 are shown as carrying vertical guide member 13 upon which slide blocks 15. Connecting the slidable blocks 15 at the back of the machine to the blocks 15 at the front of the machine are I-beams 17. Extending through the blocks 15 and in screw threaded engagement therewith are shown vertical screws 19 which at their lower ends are rotatably mounted in bosses 21 on the flange members 9 and at their upper ends in bosses 23 formed integrally with brackets 25, the latter carried by the columns and secured to the truss work. At their upper ends the screws 19 are shown as provided with helical spur gears 27 which are fixedly secured thereto and mesh with corresponding helical gears 29, the latter being fixedly carried on rotary shafts 31 extending lengthwise of the machine at opposite sides thereof, the two shafts 31 being operatively connected by a rotary lay shaft 33. As shown the lay shaft is driven by a reversible electric motor 35, through a suitable reduction gearing the casing of which is indicated at 37. It will be observed by this construction that when the motor 35 is set in operation the blocks 15 and I-beams 17 will be simultaneously raised or lowered, depending upon the direction of rotation of the motor, through equal distances.

As illustrated (see particularly Fig. 4), for supporting the pulley 1 the I-beams 17 at the right hand end of the machine as viewed in Figs. 2 and 3 carrying horizontally disposed guide bars 39 which may be secured to the vertical webs of these I-beams in any suitable manner. On this pair of guide bars is shown a slidably mounted casting 41, which at opposite edges is formed with downwardly facing bearing surfaces 43 engaging correspondingly formed upwardly facing bearing surfaces on the guide bars, while the casting also carries brackets 45, the upward surfaces of which form bearing surfaces engaging the downwardly facing bearing surfaces 47 on the guide bars. It will be observed by this construction that the casting 41 is securely held on the guide bars for sliding movement.

Herein for driving the saw the pulley 1 is operatively connected to an electric motor 49, said motor being carried by the casting 41 and moving therewith. As shown the motor is geared by a chain belt 51 and sprocket wheels 53 and 55 to a lay shaft 57 rotatably mounted in four spaced bearing members 59 carried by the casting 41. The pulley 1 is rotatably mounted on a housing having the upper section 61 and lower section 63, the latter having bearing portions 65 rotatably mounted on the shaft 57. The hub 67 of the pulley 1 is shown at 68 as keyed to a shaft 69, the upper end of the shaft being rotatably mounted in a bearing 71 formed integrally with the upper section 61 of the housing, while the hub 67 is rotatably supported in a bearing 73 formed integrally with the lower section 63 of this housing. As is clearly shown by Fig. 4, the lower face of the bearing 71 and the upper face of the bearing 73 contact with upper and lower radial surfaces 75 on the pulley for preventing movement of the pulley in the direction of its axis relative to the pulley supporting housing. As shown at its lower end the shaft 69 has keyed thereto a bevel gear 77 in mesh with a bevel pinion 79 non-rotatably secured to the pulley driving shaft 57. It will be observed by the construction just described that the motor 49 when in operation rotates the pulley 1, while said housing may be oscillated about the shaft 57 to cause the axis of the pulley to tilt.

The pulley 3 as shown by Fig. 5 is supported in a manner similar to the pulley 4 except that the motor 49 associated with the pulley 4 is omitted, together with the driving connections between the motor and the pulley. Herein the pulley 3 is provided with oppositely projecting stub shafts 81 respectively rotatably supported in bearings formed in the upper and lower sections 83 and 85 of a pulley supporting housing, which housing is mounted for tilting on a shaft 87 supported on brackets 89. As shown the brackets 89 are mounted on a plate 91 to which they may be secured in any suitable manner, the plate being slidably mounted on a casting 92 so that the distance between the pulleys 1 and 3 may be varied for tightening or loosening the belt. Herein for this purpose the supporting I-beam 17 for the pulley 3 nearest the pulley 1 has secured thereto a nut 93 through which is threaded a screw 95 the end of which bears against the end of the plate 91, the plate being provided with slots 97 through which pass bolts 99 threaded into the casting 92 for clamping said plate in adjusted position to said casting. The casting 92 is supported on the adjacent I-beams 17 for sliding movement in the identical manner described for supporting the casting 41, and therefore the construction will not be described.

As shown herein the machine is arranged for causing the saw to form a saw cut the profile of which is indicated at P in Fig. 1. At the side of the machine opposite the pulleys 1 and 3 are shown cam members or templates 101 which are channel-shaped in cross-section as indicated in Fig. 3, and as indicated in Fig. 1 are curved longitudinally to approximately the shape of the profile of the saw cut to be formed.

The pulley supporting castings 41 and 92 are shown as carrying a pair of brackets 103 (see Figs. 1 and 3) which pivotally carry a lever 105 midway its length. Connecting opposite ends of the levers 105 with the respective upper and lower portions of the supporting housings for the pulleys are shown links 107, these links being pivotally attached to the ends of the levers 105 and to the pulley housings with the axes of the connections to the housings intersecting the axial lines of the pulleys. As shown the ends of the levers 105 opposite their pivotal connections to the links 107 carry pins or rollers 109 which enter the slots formed by the channel-shaped templates 101.

It will be observed that with the construction described if the motor 35 is set in operation to cause the pulley supporting castings 41 and 92 to be fed downwardly the axes of the saws will be tilted by reason of the engagement of the pins 109 with the templates, and at the same time said pins and the associated links 107 and levers 105 will cause the castings 41 and 92 to be moved horizontally on the guide bars 39, with the result that the profile of the saw cut will correspond with the curvature of the template. Preferably the cutting faces of the saw are arranged approximately in the same plane as the axes of the shafts 57 and 87 about which the pulleys rock, which planes approximately correspond to the radius of curvature of the profile of the saw cut, with the result that the plane of the cutting side of the saw is maintained approximately tangent to the curvature of the saw cut.

The saw employed in connection with the machine may be of any suitable construction, for example that illustrated by Figs. 6, 7 and 8, which show a pair of spaced cables 111 carrying plate like members 113 formed with eyes 115 through which the cables are threaded. As shown each of the members 113 carries a saw tooth 117 which may be formed of pieces of rectangular iron bar slotted at their upper edges as indicated at 119 to receive the lower edges of the members 113 to which they may be secured by rivets 121. As shown the plate like members 113 at opposite sides are formed adjacent the teeth with projections 123 having cylindrical surfaces 125, these surfaces of adjacent plate like members being in rolling contact.

With the saw constructed as shown in Figs. 6 and 7 the pulley may be formed as indicated in Fig. 8, namely with the peripheral grooves 127 on its face which receive the eyes 115, thereby preventing the saw slipping off said face. Preferably the pulley may be faced with a layer 129 of rubber or other yielding material providing a friction producing surface for engaging the saw and permitting the plate like members better to conform to the pulley. It will be observed that the saw teeth are thicker than the width of the plate like members and the diameters of the exteriors of the eyes 115, which enables the portion of the saw behind the saw teeth to clear the sides of the saw cut.

The machine herein disclosed is an improvement on that disclosed in my co-pending application Serial No. 210,171, filed August 2, 1927.

Although I have described one specific construction of machine and one specific construction of saw applied to a machine for cutting granite it will be understood that within the scope of the invention wide deviations may be made from these constructions without departing from the spirit of the invention, and that the invention is not limited to machines for cutting stone.

Claims:

1. A sawing machine having, in combination, a saw comprising a row of saw teeth connected for relative movement transversely to the plane in which said teeth lie to form an endless chain, spaced pulleys for supporting and driving said chain, and feeding means operative to cause said saw to form a saw cut which is non-rectilinear in the direction in which said cut is advanced.

2. A sawing machine having, in combination, a saw comprising a row of saw teeth connected for relative movement transversely to the plane in which said teeth lie to form an endless chain, spaced pulleys for supporting and driving said chain, and feeding means operative to cause said saw to form a saw cut of predetermined non-rectilinear profile in planes transverse to said cut comprising mechanism for tilting said pulleys while advancing them toward the work.

3. A sawing machine having, in combination, spaced pulleys for supporting a band saw; and means for causing the forming by said saw of a saw cut of non-rectilinear profile in planes transverse to said cut comprising mechanism for tilting said pulleys, and for moving them in a direction transverse to said cut and in a direction at an angle to said first mentioned direction.

4. A sawing machine having, in combination, spaced pulleys for supporting a band saw; and means for causing the forming by said saw of a saw cut of predetermined non-rectilinear profile in planes transverse to said cut comprising means for predeterminately tilting said pulleys and simultaneously therewith moving said pulleys toward the work in each of two predetermined directions.

5. A sawing machine having, in combination, spaced pulleys for supporting a band saw; and means for causing the forming by said saw of a saw cut of predetermined non-rectilinear profile in planes transverse to said cut comprising means for predeterminately tilting said pulleys to maintain the cutting portions of said saw in planes approximately tangent to the portions of said profile corresponding to the bottom of the saw cut while moving said pulleys toward the work in such changing directions as to cause the instantaneous feeding movement of said saw relative to the work to be in said planes.

6. A sawing machine having, in combination, spaced pulleys for carrying a band saw adapted to form a downwardly advancing band saw cut, a motor for driving said pulleys, a supporting means for said pulleys and motor, said pulleys and motor being mounted for movement as a unit relative to said supporting means, and means for raising and lowering said supporting means.

7. A sawing machine having, in combination, spaced pulleys for carrying a band saw adapted to form a downwardly advancing band saw cut, a motor for driving said pulleys, supports for said motor and pulleys, said motor and pulleys being mounted for movement as a unit relative to said supports, a frame carrying said supports, and power operated means for raising and lowering said supports relative to said frame while maintaining said pulleys and motor in the same geometric relation to each other.

8. A sawing machine having, in combination, spaced pulleys for carrying a band saw adapted to form a downwardly advancing band saw cut, a motor for driving said pulleys, supports for said motor and pulleys, said motor and pulleys being mounted for movement as a unit relative to said supports, a frame carrying said supports, and power operated means for moving said supports relative to said frame while maintaining said pulley and motor in the same geometric relation to each other.

9. A sawing machine comprising, in combination, a frame, spaced pulleys for supporting a band saw, means for driving said saw, said pulleys carried on substantially vertically and horizontally movable supporting means, the axes of said pulleys mounted on said supporting means for tilting in vertical planes.

10. A sawing machine comprising, in combination, a frame, spaced pulleys for supporting a band saw, means for driving said saw, said pulleys carried on substantially vertically and horizontally movable supporting means, the axes of said pulleys mounted on said supporting means for tilting in vertical planes, and means for coordinately and simultaneously in predetermined relation moving said support in each of said directions and tilting said axes.

11. A sawing machine comprising, in combination, a frame, spaced pulleys for supporting a band saw, means for driving said saw, said pulleys carried on substantially vertically and horizontally movable supporting means, the axes of said pulleys mounted on said supporting means for tilting in vertical planes, means acting to feed said supporting means downwardly, and means responsive to such downward feeding for coordinately and simultaneously in predetermined relation tilting the axes of said pulleys and for moving said supporting means horizontally.

12. A sawing machine comprising, in combination, a frame, spaced pulleys for supporting a band saw, means for driving said saw, said pulleys being carried on a supporting means movable in each of two directions, the axes of said pulleys being mounted on said supporting means for tilting, means for feeding said supporting means in one of said directions, and means responsive to such feeding for predeterminately moving said supporting means in the other of said directions and for simultaneously predeterminately tilting said axes.

13. A sawing machine comprising, in combination, a frame, spaced pulleys for supporting a band saw, means for driving said saw, said pulleys being carried on a supporting means movable in each of two directions, the axes of said pulleys being mounted for tilting in a plane normal to one of said directions, means for feeding said supporting means in one of said directions, and means responsive to such feeding for predeterminately moving said supporting means in the other of said directions and for predeterminately tilting said saw.

14. A sawing machine comprising, in combination, a frame, spaced pulleys for supporting a band saw, means for driving said saw, said pulleys being carried on a supporting means movable in each of two directions, the axes of said pulleys being mounted for tilting in a plane normal to one of said directions, means for feeding said supporting means in one of said directions, and cam actuated means responsive to such feeding for predeterminately moving said supporting means in the other of said directions and for predeterminately tilting said saw.

15. A sawing machine comprising, in combination, a frame, spaced pulleys for supporting a band saw, means for driving said saw, said pulleys being carried on a supporting means movable in each of two directions, the axes of said pulleys being mounted for tilting in a plane normal to one of said directions, means for feeding said supporting means in one of said directions, and means responsive to such feeding including a template corresponding to the profile of the saw cut to be formed for predeterminately moving said supporting means in the other of said directions and for predeterminately tilting said saw.

16. In a sawing machine, spaced pulleys for carrying a band saw, each of said pulleys being mounted for tilting about a line perpendicular to the axes of pulleys and lying in a plane approximately including the cutting edges of said saw.

17. In a sawing machine, spaced pulleys for carrying a band saw, each of said pulleys being mounted for tilting about a line perpendicular to the axes of pulleys and lying in a plane approximately including the cutting edges of said saw, and a driving shaft for said pulleys coaxial with said line.

18. In a sawing machine, spaced pulleys for carrying a band saw, said pulleys being mounted for tilting about a line perpendicular to the axes of said pulleys, said line lying in a plane approximately including the cutting edges of said saw, and rotary driving means for said pulleys substantially coaxial with said line.

19. In a sawing machine, spaced pulleys for carrying a band saw, said pulleys being mounted for tilting about a line perpendicular to the axes of said pulleys, said line lying in a plane approximately including the cutting edges of said saw, and rotary driving means for said pulleys comprising meshing gears one of which is coaxial with said line and the other coaxial with the axis of one of said pulleys.

In testimony whereof, I have signed my name to this specification.

P. S. LEGGE.